(12) United States Patent
Mori et al.

(10) Patent No.: US 6,196,945 B1
(45) Date of Patent: Mar. 6, 2001

(54) FRICTIONAL ROLLER TYPE CONTINUOUSLY VARIABLE TRANSMISSION

(75) Inventors: Haruhito Mori, Kawasaki; Masaki Nakano, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/349,711

(22) Filed: Jul. 8, 1999

(30) Foreign Application Priority Data

Jul. 8, 1998 (JP) .................................................. 10-193018

(51) Int. Cl.⁷ .................................................. F16H 15/38
(52) U.S. Cl. .................................................. 476/10; 476/42
(58) Field of Search .................................. 476/10, 40, 42

(56) References Cited

U.S. PATENT DOCUMENTS 4,905,529 * 3/1990 Nakano .................................. 476/10
5,538,483 * 7/1996 Kobayashi et al. ................... 476/10

FOREIGN PATENT DOCUMENTS 63-92859   6/1988 (JP) .
7-217716 * 8/1995 (JP) .

* cited by examiner

Primary Examiner—Allan D. Herrmann
(74) Attorney, Agent, or Firm—Foley & Lardner

(57) ABSTRACT

A lower section (78*f*) of a piston boss (78*d*) of a hydraulic cylinder (80) is formed with a small radius and is inserted into a fixed gap provided with respect to the inner peripheral face of the cylinder through hole (60*d*). A thrust force F is applied to trunnions (46) supporting power rollers (29) and the trunnions (46) deform about a support position connected by an upper link (50) and a lower link (52). At the same time, even if the lower end (78*f*) of the piston boss (78*d*) undergoes a large inclination, no adverse effect results on the inner peripheral face of the cylinder through hole (60*d*). Even if the sliding section of the piston undergoes a large inclination together with a deformation of the trunnions (46), local wear and damage to the sliding face on the cylinder inner periphery can be avoided.

6 Claims, 5 Drawing Sheets

FRICTIONAL ROLLER TYPE CONTINUOUSLY VARIABLE TRANSMISSION

FIELD OF THE INVENTION

The present invention relates to a frictional roller type continuously variable transmission of which a typical example is a toroidal continuously variable transmission.

BACKGROUND TO THE INVENTION

A frictional roller type continuously variable transmission used as a toroidal continuously variable transmission is known for example by published application Jikkai-Sho-63-92859 in Japan.

A toroidal continuously variable transmission provides power to a pair of power rollers between an input disk and an output disk. The rotation of the input disk is transmitted to the output disk through the power rollers by a frictional force. Since the power rollers are gripped by a strong force which corresponds to the transmitted torque from the input and output disks, a large thrust force in the rotation axis direction of the power rollers is applied to the power rollers by the input and output disks.

The power rollers are supported by trunnions. Since the upper and lower section of the trunnion axis of the pair of trunnions are mutually connected by an upper link and a lower link, displacement due to the thrust force mentioned above is limited. However the trunnions deform about the points of support created by the respective links.

SUMMARY OF THE INVENTION

A servo-piston is mounted on the trunnion axis which comprises a hydraulic pressure servo-mechanism for displacing the trunnions in an axial direction and thus varying the angle of gyration of the power rollers. However when the trunnion axis deforms, the servo-piston also inclines and comes into contact with the inner peripheral face of the cylinder. Thus the sliding face and seal member may be damaged. In such a case, the movement of the servo-piston may be impaired or an oil leakage may occur. As a result, there will cause of reductions in speed ratio control performance.

The present invention has the object of preventing the piston sliding section from damage or an oil leakage even when the piston sliding section inclines as a result of deformation of the trunnion.

In order to achieve the above object the present invention provides a frictional roller type variable transmission. The transmission comprises a pair of power rollers gripped between an input disk and an output disk, the power rollers being able to gyrate, trunnions supporting the power rollers through an eccentric shaft and being slidable in a pivot axial direction orthogonal to the rotational axis of the power rollers, a link mechanism connecting upper and lower sections of each trunnion to support a thrust force applied to the power rollers due to a gripping force of the input disk and the output disk, a hydraulic cylinder provided with a servo-piston connected to a trunnion shaft so that said trunnion displaces in the pivot axial direction, a seal member which seals a hydraulic pressure supplied into the hydraulic cylinder housed in each sliding section of the hydraulic cylinder, the sliding sections diposed both ends of the servo-piston pass through a cylinder body, and a cylindrical gap being formed between a piston sliding outer periphery and a cylinder sliding inner periphery in the one of sliding sections which opposed to the link mechanism and the cylindrical gap positioned outwardly with respect to the seal member.

The details as well as other features and advantages of the invention are set forth in the remainder of the specification and are shown in the accompanying drawings.

DESCRIPTION OF THE PREFERRED EMODIMENTS

Figure 1:
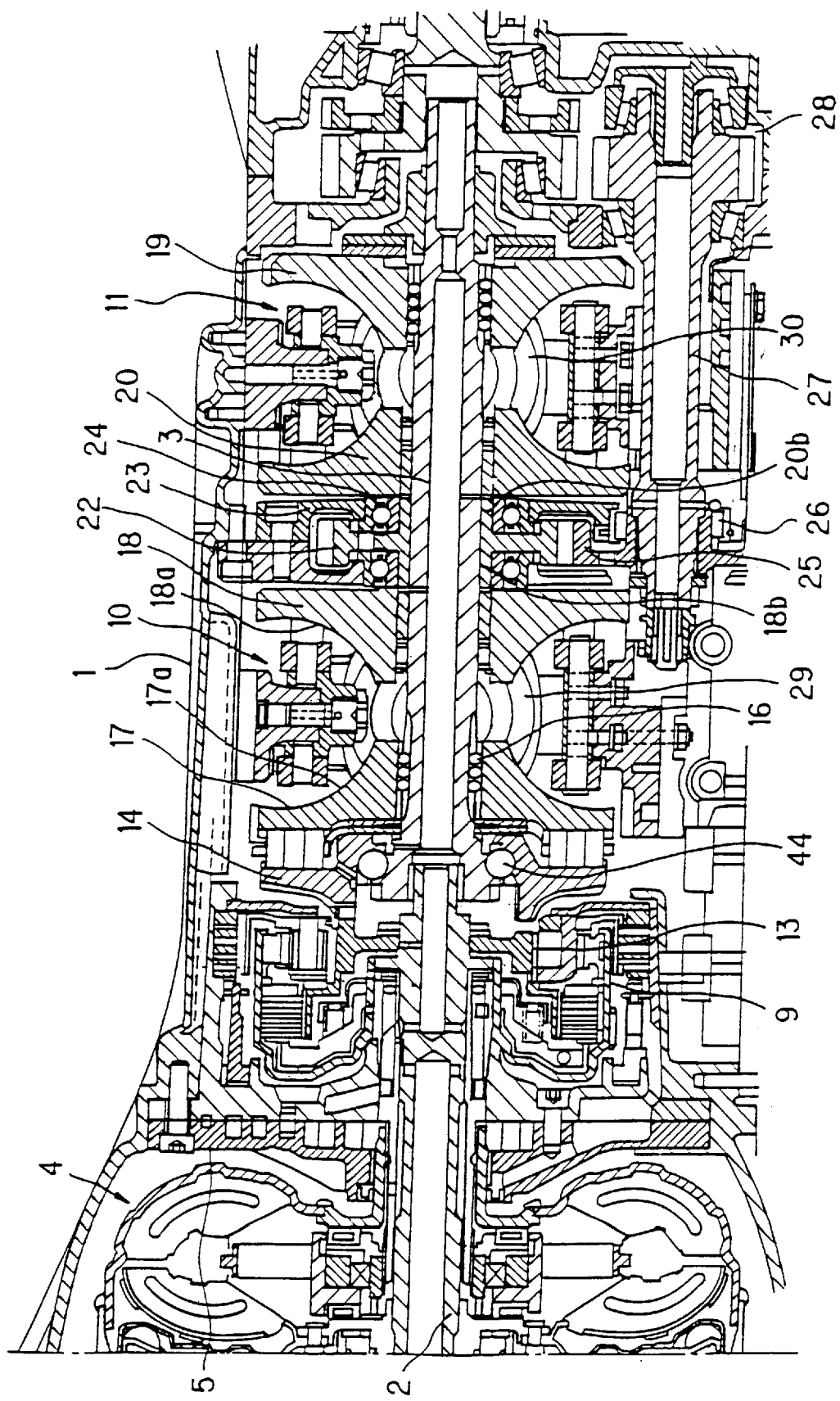
FIG. 1 is a cross sectional view of the present invention of a toroidal continuously variable transmission.

Firstly, the sequence from input force to output force will be described with reference to the schematic view of a toroidal continuously variable transmission shown in FIG. 1.

The rotational force of the engine is input into the input shaft 2 through a torque converter 4 in the transmission case 1. A rotation shaft 3 is disposed on the same axis on the right of the input shaft 2. An oil pump 5 is mounted on the input shaft 2 and a drive switching mechanism 9 is disposed to the right of the oil pump 5 to transmit the rotations of the input shaft 2 without variation or in a reversed state to the rotation shaft 3.

First and second toroidal variable mechanisms 10, 11 having two toroidal shaped cavities are mutually disposed separated in the axial direction on the rotation shaft 3.

An input disk 17 is supported in free rotation on the rotation shaft 3 through a ball spline 16 on the first toroidal variable mechanism 10. An output disk 18 is disposed co-axially on the rotation shaft 3 to rotate freely. A pair of power rollers 29 is sandwiched in the cavity formed by the toroidal face 17a of the input disk 17 and the toroidal face 18a of the input disk 18.

The power rollers 29 are supported to freely vary an angle of gyration by a support mechanism called a trunnion which will be discussed below. The contact position (contact radius) of the input disk 17 and output disk 18 with the power roller 29 is varied by operating the trunnion with an oil cylinder which will be discussed below. Thus the ratio of the speed change, that is to say, the drive ratio of the rotations transmitted from the input disk 17 to the output disk 18 may be continuously varied.

A loading cam 14 which transmits the rotations from the drive switching mechanism 9 above to the input disk 17 of the first toroidal variable mechanism 10 is disposed on the rear face of the input disk 17. The loading cam 14 presses the input disk 17 from the rear face in response to a torque of the input rotations. Thus the force of sandwiching the power roller 29 is increased in response to the torque transmitted between the input disk 17 to the output disk 18.

Thus rotational force from the engine which is transmitted to the input shaft 2 is adapted to be transmitted to the rotation shaft 3 sequentially via the loading cam 14 the input disk 17 and the ball spline 16 through the drive switching mechanism 9. The loading cam 14 is supported free to rotate on the rotation shaft 3 by a ball spline 44.

The second toroidal variable mechanism 11 has an input disk 19, an output disk 20, power rollers (frictional rollers) 30 in the same manner as the first toroidal variable mechanism 10 above. However the position of the input disk 19 and the output disk 20 is reversed with respect to the first toroidal variable mechanism 10. The output disk 18 of the first toroidal variable mechanism 10 and the output disk 20 of the second toroidal variable mechanism 11 are disposed next to each other.

An output gear 22 is disposed between the rear face of the output disks 18, 20. Cylindrical shafts 18b, 20b provided on the output gear 22 are respectively spline jointed to the inner peripheral face of each output disk 18, 20. Thus the output disks 18, 20 and the output gear 22 rotate in an integrated manner. The output gear 22 is supported to rotate freely through a bearing 24 on the gear housing 23 which is fixed to the inner peripheral wall of the transmission case 1.

The cylindrical shafts 18b, 20b are disposed on the outer periphery of the rotation shaft 3 and are adapted to rotate freely with respect to one another. As a result, the output disks 18, 20 rotate relative to the rotation shaft 3.

The output gear 22 meshes with a counter gear 25. The counter gear 25 is supported to freely rotate by a bearing 26 on the gear housing 23. The counter gear 25 is spline jointed at one end of a counter shaft 27 and the other end of the counter shaft 27 is supported to rotate freely on the transmission case 1.

The rotation force from the engine transmitted to the rotation shaft 3 is dispersed to the input disks 17, 19 of the first and second toroidal variable mechanisms 10, 11. After being transmitted to the output disks 18, 20 of each toroidal variable mechanism 10, 11 at a fixed speed ratio which depends on the gyrational operation of the power rollers 29, 30 discussed above, the rotational force of the engine is transmitted to the output shaft 33 through the output gear and through the sequence of the counter gear 25, the counter shaft 27 and the gear series 28.

Figure 2:
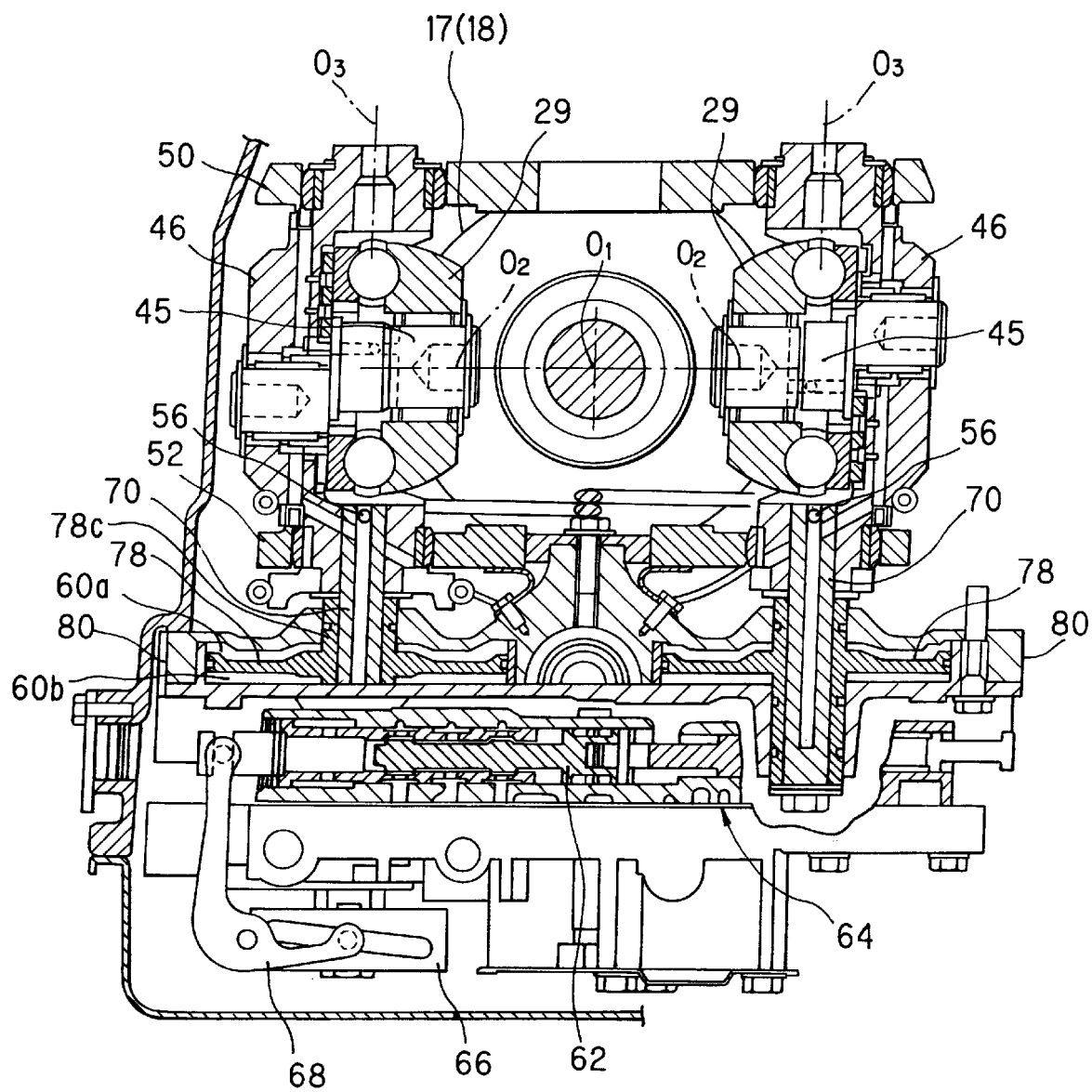
FIG. 2 is a cross sectional view of the FIG. 1.

Next the hydraulic servo-mechanism and the support mechanism of the power rollers 29, 30 will be described with reference to FIG. 2. FIG. 2 however shows first toroidal variable mechanism 10 mainly.

As shown in FIG. 2, a pair of power rollers 29 is supported free to rotate on respective eccentric shaft 45 of a pair of trunnions 46. The power rollers 29 rotate about the power rotation axis $O_2$ of the eccentric shaft 45.

The upper and lower section of each trunnion 46 is supported by an upper link 50 and a lower link 52 so as to rotate about an pivot axis $O_3$ which intersects with the axis 02. The trunnions 46 are also supported to be slidable in an axial direction by an upper link 50 and a lower link 52.

The upper link 50 and the lower link 52 are disposed to be mutually parallel and are supported in a central section respectively. The links 50 and 52 prevent displacement of the power rollers 29, which are gripped by the input and output disks 17 and 18, towards the outer side of the axial direction $O_2$.

A shaft 70 which extends in the direction of the pivot axis $O_3$ is connected by a pin 56 to the trunnions 46. A servo-piston 78 of the hydraulic cylinder 80 which comprises a hydraulic servo-mechanism is connected to the shaft 70.

Piston bosses 78c and 78d are integrated on both sides of the servo-piston 78. The shaft 70 passes through and is fixed to the piston bosses 78c and 78d. The servo-piston 78 slides on the inner section of a cylinder body 60 and controlled oil pressure is supplied from a control valve 64 for speed ratio control to oil chambers 60a, 60b which are formed on both sides of the piston 78.

In such a way, when the servo-piston 78 displaces, the trunnions 46 displace in the axial direction of the pivot axis $O_3$. Since the rotational axis $O_2$ of the power rollers maintains the same position as shown in the FIG. 2 which intersects with the rotational axis $O_1$ of the input and output disks 17, 18 due to the gripping forth applied on the power rollers 29, the eccentric shaft 45 rotates about the rotational axis $O_2$ according to the displacement of the trunnions 46, so the power rollers 29 incline about the pivot axis $O_3$ which causes a rotation of the trunnions 46 with same axis $O_3$.

As a result, the contact position of the power rollers 29 varies with respect to the input and output disks 17, 18 and the speed ratio transmitted to the output disk 17 from the input disk 18 varies.

A precess cam 66 is fixed on the lower end of the shaft 70 on the left side of FIG. 2. The movement of the trunnions 46 as discussed above is feedback controlled through the precess cam 66 and a variable link 68 to the control valve 64 which is housed free to slide on the control valve body 62.

When the actual speed ratio and the target speed ratio are equal as a result of the feedback control, the control valve 64 returns to a neutral position and maintains the gyrational position of the power rollers 29 in the same position.

As shown above, a force acts on power rollers 29, which are gripped by input and output disks 17, 18, to drive them in the direction of the axis $O_2$. In this way, the trunnions 46 deform about the upper link 50 and lower link 52 support points and the shaft 70 inclines to the axis $O_3$.

When this is the case, the servo-piston 78 which is integrated with the shaft 54 also inclines, the sliding face of the piston 78 comes into local contact with the inner peripheral face of the cylinder. In such a way, the movement of the servo-piston 78 is not smoothly performed and the sliding face may be damaged.

In particular, as the deformation increases towards the end of the shaft 70 away from the support point of the lower link 52. This creates a great problem with respect to the piston boss section 78c on the shaft end and the cylinder sliding face.

The present invention is proposed to solve the above problem and will be described in detail below.

Figure 3:
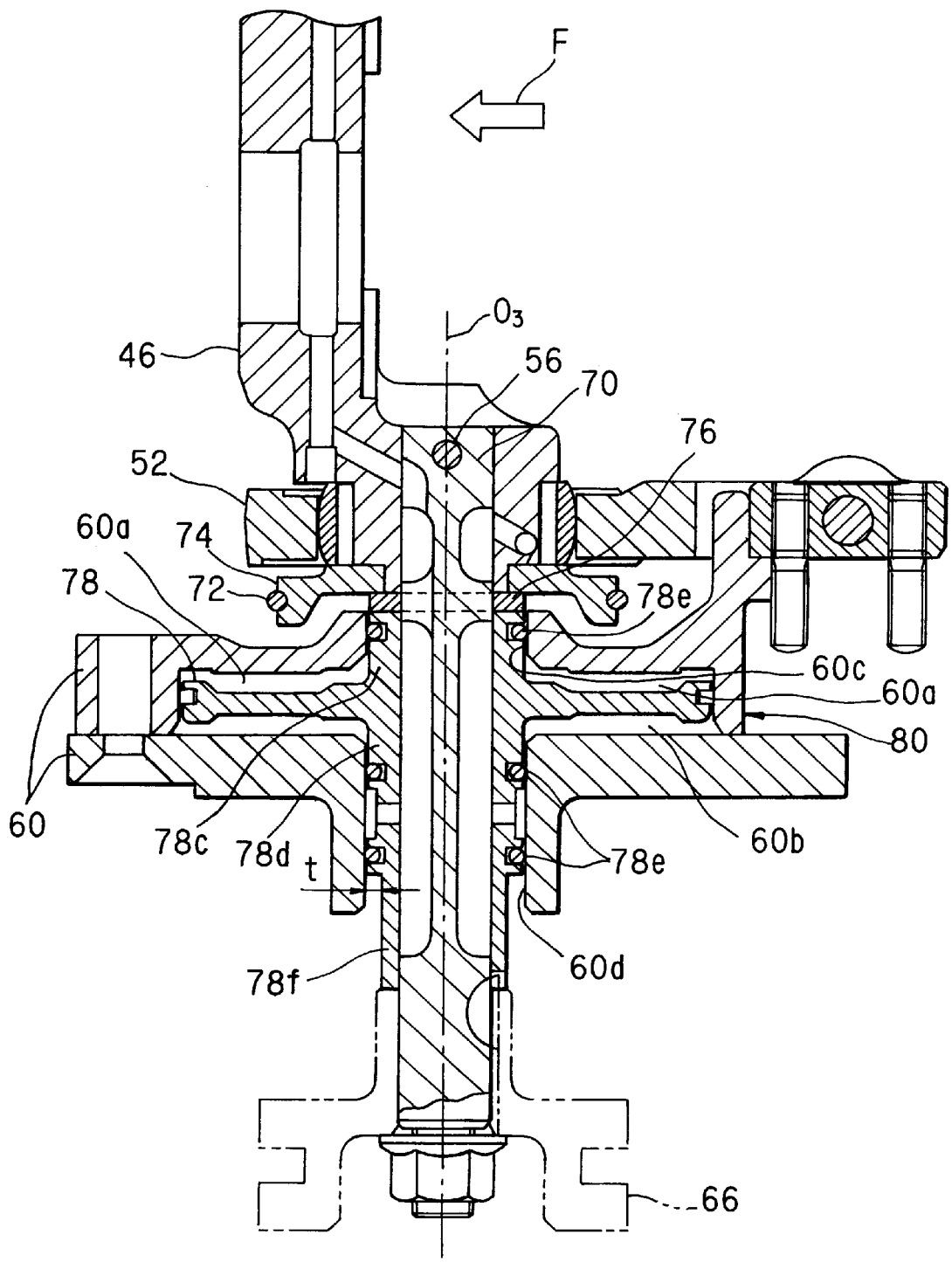
FIG. 3 is a cross section showing a first embodiment of a hydaulic servo-mechanism of the present invention.

As shown in FIG. 3, wire pulley 74 which loops wire 72 in order to synchronize the gyrations of the power rollers 29 of the first and second toroidal variable mechanisms 10, 11 is fixed onto the trunnion shaft 70 of the trunnions 46. A washer 76 stopping detachment of the pulley of the wire pulley 74 is inserted into the trunnion shaft 70.

The servo-piston 78 of the hydraulic cylinder 80 is formed from a iron-type hard material. In contrast, the cylinder body 60 is formed by a soft metallic material such as aluminum.

Through holes 60c and 60d are provided at inner both ends of the cylinder body 60 through which piston bosses 78c, 78d on both sides of the servo-piston 78 are supported to be slidable. Furthermore oil chambers 60a, 60b are formed both side of the servo-piston 78 in the cylinder 80.

A plurality of ring-shaped grooves are formed on the outer periphery of the piston boss 78c and 78d. Respective O rings 78e are inserted into these grooves. These O rings 78e prevent external oil leakage from the oil chambers 60a, 60b by contact with the inner peripheral face of the through holes 60c, 60d and serve as sealing members.

The outer radius of the lower section 78f of one piston boss 78d is formed smaller than the dimensions of the outer radius of the upper section. As a result, a fixed cylindrical gap (t) is provided between the outer periphery of the lower section 78f of the piston boss 78d and the inner periphery of the through hole 60d.

The dimensions of the gap (t) are set to a value which is greater than the maximum deviation E with respect to the estimated pivot axis $O_3$ of the lower section 78f of the piston boss 78d.

The power rollers 29 are sandwiched by the input and output disks 17, 18 during speed ratio control, a thrust force F is applied to the power rollers 29 which drives the power rollers 29 to the direction of the axis $O_2$. In such a way, when a thrust force F is applied to trunnions 46 which support power rollers 29 and the trunnions 46 deform from a support position to which the upper link 50 and the lower link 52 are connected. The trunnion shaft 70 and the piston boss 78c, 78d incline with respect to the pivot axis 03 and in particular the lower section 78f of the piston boss 78d undergoes a large inclination.

However since a fixed gap (t) is provided between the lower section 78f of the piston boss 78d and the inner peripheral face of the through hole 60d, even if the lower section 78f undergoes a large inclination, contact with the inner peripheral face of the through hole 60d can be avoided. As a result, damage to the inner peripheral face of the through hole 60d is prevented. In addition, the movement of the servo-piston 78 is not affected and leakage of control oil may be avoided.

As a result, the accuracy of speed ratio control performance is increased and operational characteristics are stabilized.

Reducing the radius of the lower section 78f of the piston boss 78d allows for simple manufacturing.

If necessary the inner radius of the through hole 60d is increased, a fixed gap (t) may be formed between the lower section 78f of the piston boss 78d.

Figure 4:
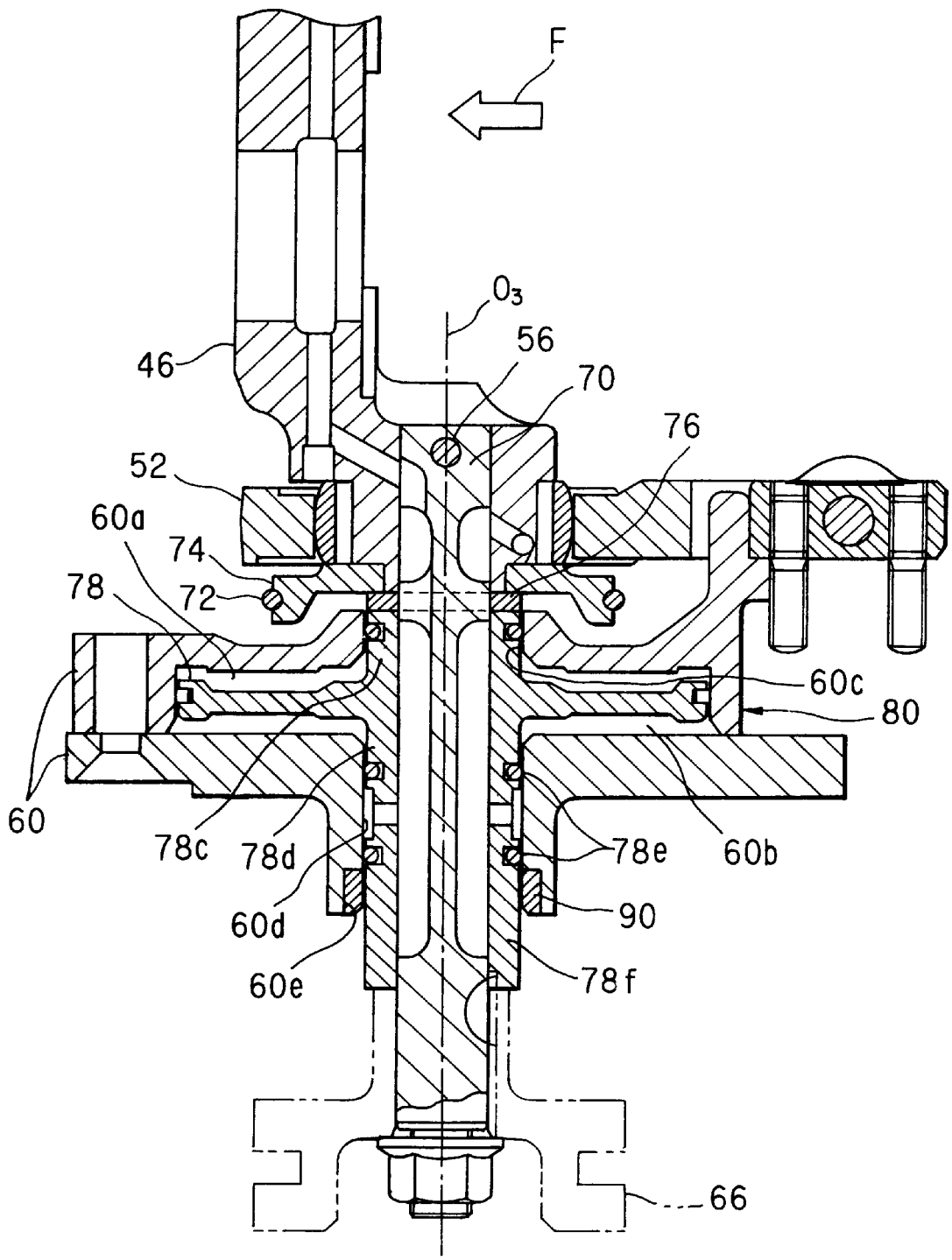
FIG. 4 is a cross section showing a second embodiment of a hydaulic servo-mechanism of the present invention.

Next a second embodiment of the invention will be described with reference to FIG. 4.

Those structures that are the same as those in the first embodiment as shown in FIG. 3 are designated with the same numbers and will not be described again.

The lower section 78f of the piston boss 78d is formed with the same outer radial dimensions as the upper section of the piston boss 78c. The cylinder body 60 is formed from a soft metallic material such as aluminum. A large radial section 60e which enlarges the inner radius of the lower section of the through hole 60d is formed. A hard cylindrical collar 90 formed from the same hard metallic material such as iron as the servo-piston 78 is housed in the large radius section 60e. The inner radius of the hard collar 90 is set to be slightly greater than the outer radius of the lower section 78f of the piston boss 78d.

In this way, a thrust force F may be applied to the trunnions 46 which support the power rollers 29 and the trunnions 46 deform about the positions connected to the upper link 50 and the lower link 52. At the same time, the lower section 78f of the piston boss 78d undergoes a large inclination and even in the circumstance that it comes into contact with the hard collar 90, no wear results as it is formed from the same hard metallic material such as iron. Thus the problem of oil leakage due to local wear can be prevented.

Figure 5:
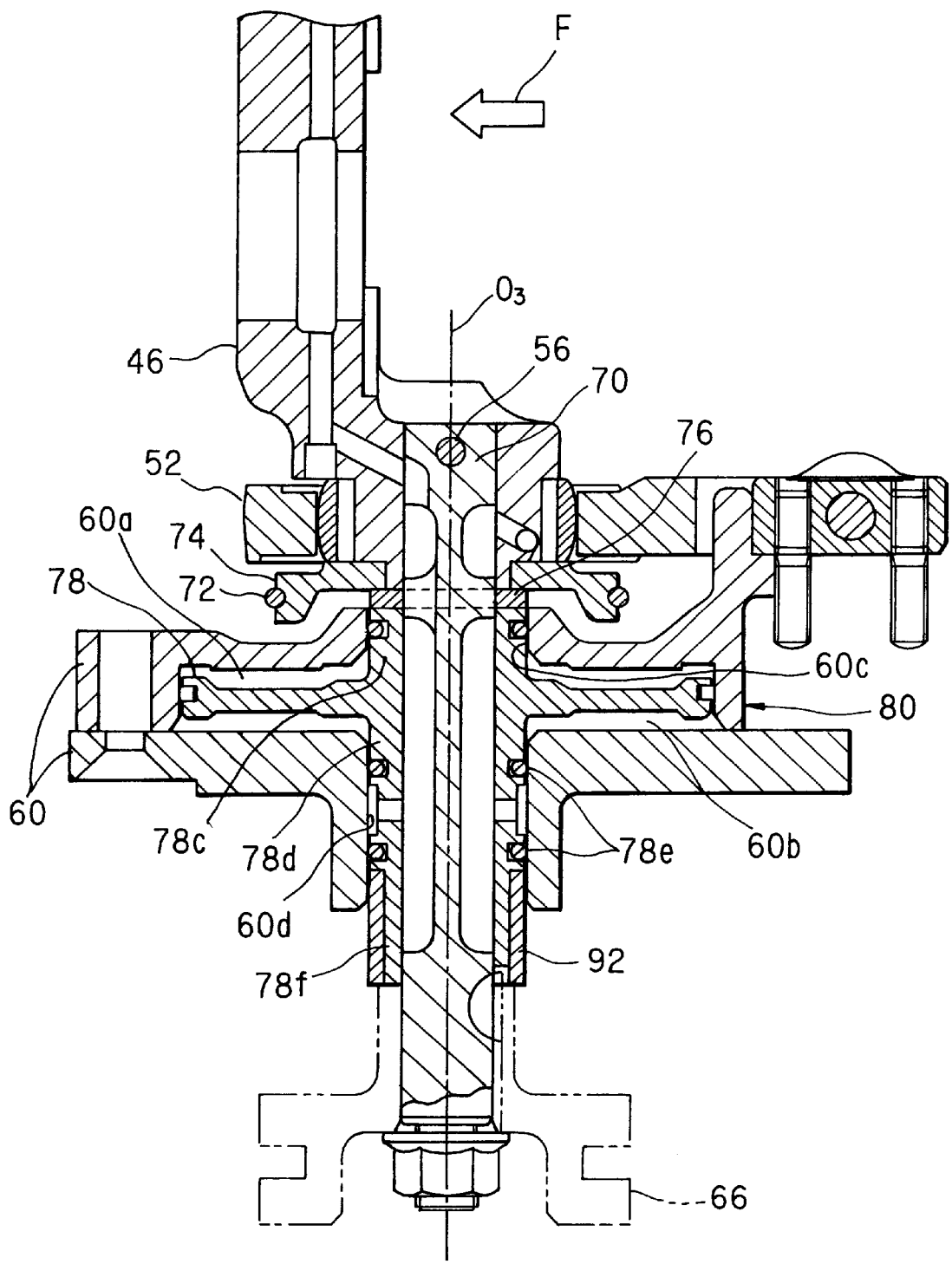
FIG. 5 is a cross section showing a third embodiment of a hydaulic servo-mechanism of the present invention.

Next a third embodiment of the present invention will be described with reference to FIG. 5.

In this embodiment, the lower section 78f of the piston boss 78d is formed to be smaller than the outer radius of the piston boss 78c on the upper section. A soft cylindrical collar 92 formed from the same soft metallic material such as aluminum as the cylinder body 60 is disposed in the lower section 78f.

The outer radius of the soft collar 92 is set to be slightly smaller than the inner radius of the through hole 60d. The inner radius of the soft collar 92 is set to be slightly larger than the outer radius of the lower section 78f. In this way, the soft collar 92 is rotatable about the periphery of the piston boss.

A thrust force F is applied to the trunnions 46 which support the power rollers 29 and the trunnions 46 deform about the position connected to the upper link 50 and lower link 52. At the same time, when the lower section 78f of the piston boss 78d undergoes a large inclination, the soft collar 92 may come into contact with the through hole 60d.

However since the soft collar 92 is formed from the same soft metallic material such as aluminum as the cylinder body 60, little wear results on the contact surface and damage to the sliding surface can be avoided.

Since the soft collar 92 rotates relative to the piston boss 78d, even if the trunnions 46 and the piston boss 78d rotate, the soft collar 92 itself does not rotate. As a result, wear to the contact surface with the through hole 60d is further reduced.

The entire contents of Japanese Patent Application P10-193018 (filed Jul. 8, 1998) is incorporated herein by reference. Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. A frictional roller type continuously variable transmission comprising:

a pair of power rollers gripped between an input disk and an output disk, said power rollers being able to gyrate;

trunnions supporting said power rollers and being slidable in a pivot axial direction orthogonal to the rotational axis of said power rollers;

a link mechanism connecting upper and lower sections of each trunnion to support a thrust force applied to said power rollers due to a gripping force of said input disk and said output disk, a hydraulic cylinder provided with a servo-piston connected to a trunnion shaft so that said trunnion displaces in said pivot axial direction, a sealing member which seals a hydraulic pressure supplied into said hydraulic cylinder housed in each of two sliding sections of said hydraulic cylinder, said two sliding sections formed with through holes through a cylinder body of the hydraulic cylinder and disposed respectively on both ends of said servo-piston's passage through the cylinder body; and a cylindrical gap being formed between an outer peripheral surface of the sliding piston and an inner peripheral surface of the cylinder in one of said two sliding sections that is further than said link mechanism, said cylindrical gap being positioned outwardly with respect to said sealing member, wherein said cylindrical gap is formed at only one section of a piston boss provided in two sections, said two sections arranged on either side of said servo-piston respectively, such that said cylindrical gap is located at said one section of the piston boss that is positioned further from said link mechanism and wherein said cylinder body is formed from a soft metallic material, said servo-piston being formed from a hard metallic material, said cylindrical gap being formed as a large radial section in said through hole formed in said one of said two sliding sections, and wherein a sleeve formed from the same hard metallic material as the servo-piston is inserted into said large radial section.

2. A frictional roller type continuously variable transmission comprising:

a pair of power rollers gripped between an input disk and an output disk, said power rollers being able to gyrate;

trunnions supporting said power rollers and being slidable in a pivot axial direction orthogonal to the rotational axis of said power rollers;

a link mechanism connecting upper and lower sections of each trunnion to support a thrust force applied to said power rollers due to a gripping force of said input disk and said output disk;

a hydraulic cylinder provided with a servo-piston connected to a trunnion shaft so that said trunnion displaces in said pivot axial direction;

a sealing member which seals a hydraulic pressure supplied into said hydraulic cylinder housed in each of two sliding sections of said hydraulic cylinder, said two sliding sections disposed respectively on both ends of said servo-piston's passage through a cylinder body of the hydraulic cylinder; and a cylindrical gap being formed between an outer peripheral surface of the sliding piston and an inner peripheral surface of the cylinder in one of said two sliding sections that is further than said link mechanism, said cylindrical gap being positioned outwardly with respect to said sealing member, wherein said cylindrical gap is formed at only one section of a piston boss provided in two sections, said two sections arranged on either side of said servo-piston, respectively, such that said cylindrical gap is located at a position further from said link mechanism, and wherein said cylinder body is formed from a soft metallic material, said servo-piston being formed from a hard metallic material, said cylindrical gap being formed as a small radial section in said one section of said piston boss, and wherein a sleeve formed from the same soft metallic material as said cylinder body is inserted into said small radial section.

3. A frictional roller type continuously variable transmission according to claim 2 wherein said sleeve formed from said hard metallic material being inserted to be rotatable with respect to said small radial section of said piston boss.

4. A frictional roller type continuously variable transmission comprising:

a pair of power rollers gripped between an input disk and an output disk, said power rollers being able to gyrate;

trunnions supporting said power rollers and being slidable in a pivot axial direction orthogonal to the rotational axis of said power rollers;

a link mechanism connecting upper and lower sections of each trunnion to support a thrust force applied to said power rollers due to a gripping force of said input disk and said output disk;

a hydraulic cylinder provided with a servo-piston connected to a trunnion shaft so that said trunnion displaces in said pivot axial direction; and a sealing member which seals a hydraulic pressure supplied into said hydraulic cylinder housed in each of two sliding sections of said hydraulic cylinder, said two sliding sections disposed respectively on both ends of said servo-piston's passage through a cylinder body of the hydraulic cylinder, wherein a sliding contact portion of the cylinder body and a sliding contact portion of the servo-piston are made of a same material.

5. A frictional roller type continuously variable transmission according to claim 4, wherein an inner portion of the sliding contact portion of the cylinder body is formed as a cylindrical collar of the same material as the servo-piston.

6. A frictional roller type continuously variable transmission according to claim 4, wherein an outer portion of the sliding contact portion of the servo-piston is formed as a cylindrical collar of the same material as the cylinder body.

* * * * *